Sept. 23, 1924.

J. M. JOHNSON 1,509,432

COMBINED REAPER, BINDER, AND SHOCKER

Filed March 25, 1921    5 Sheets-Sheet 1

Inventor
J. M. Johnson,

Attorney

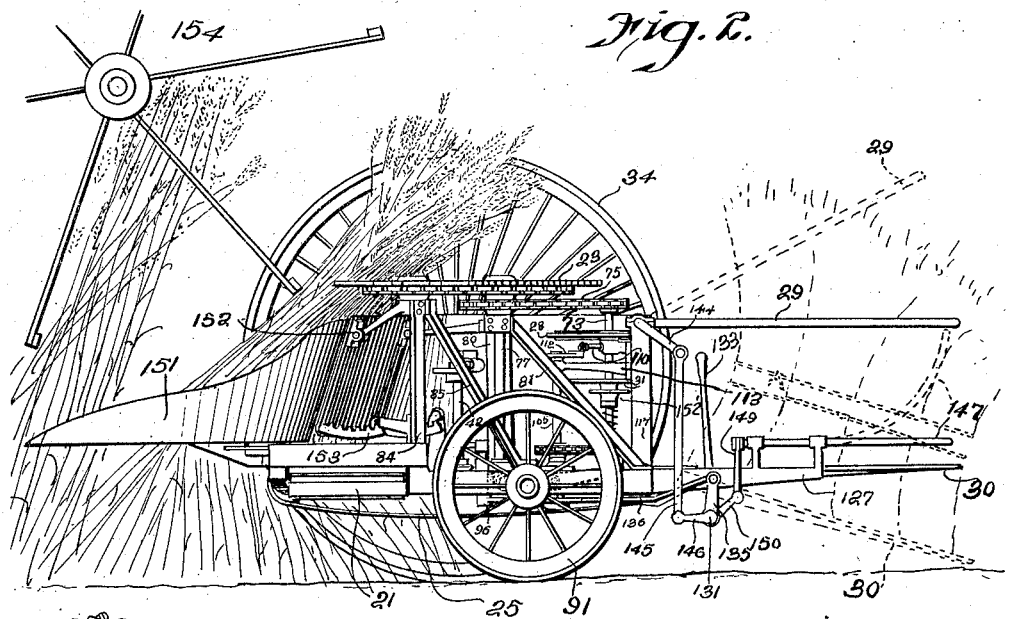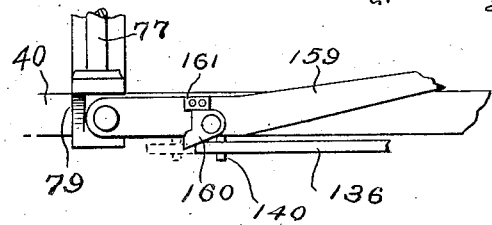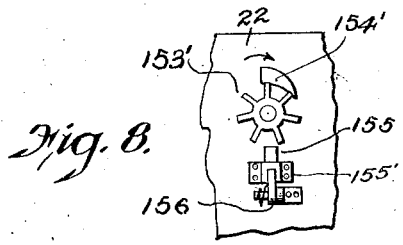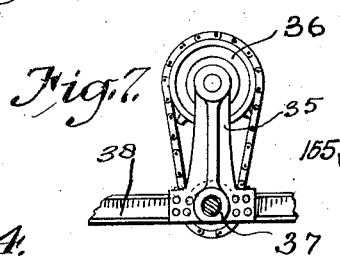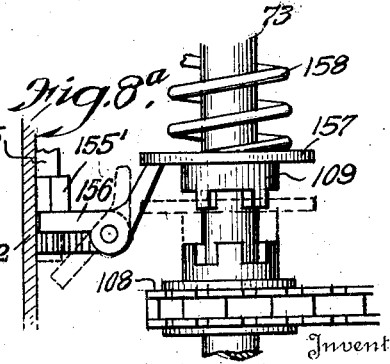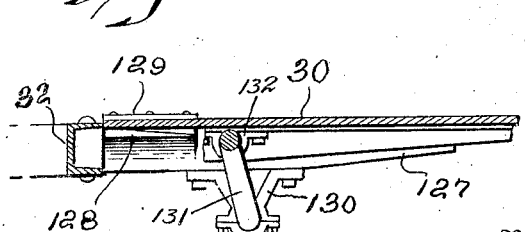

Sept. 23, 1924.
J. M. JOHNSON
COMBINED REAPER, BINDER, AND SHOCKER
Filed March 25, 1921
1,509,432
5 Sheets-Sheet 3
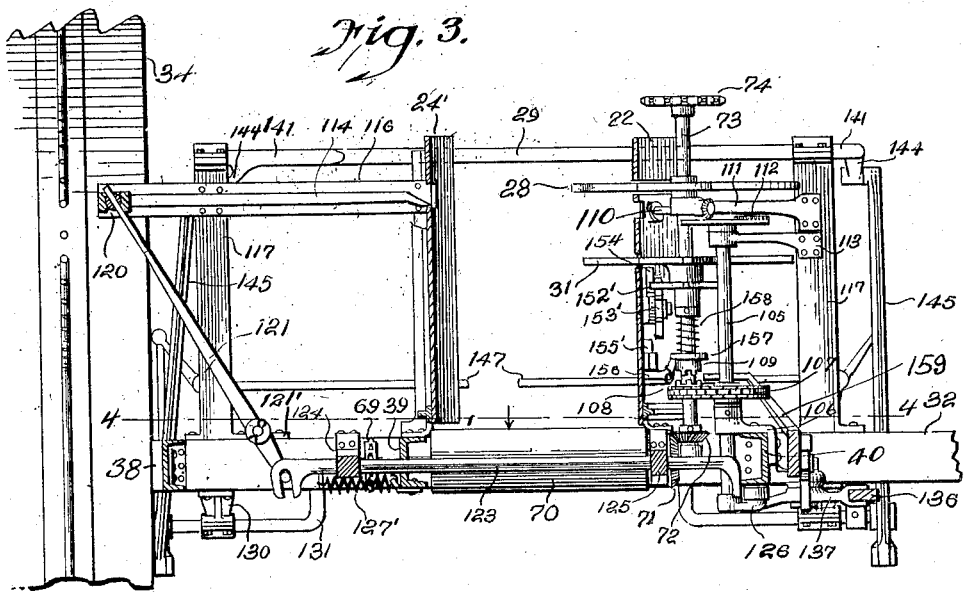
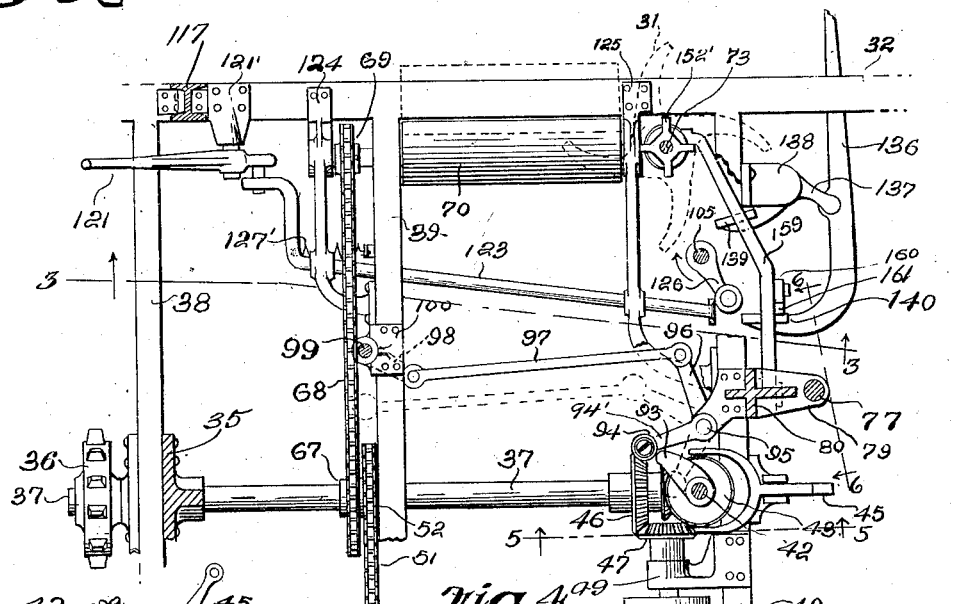
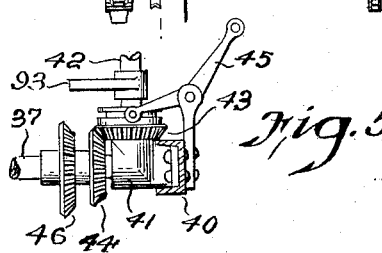
Inventor
J. M. Johnson,
By H. L. Woodward
Attorney

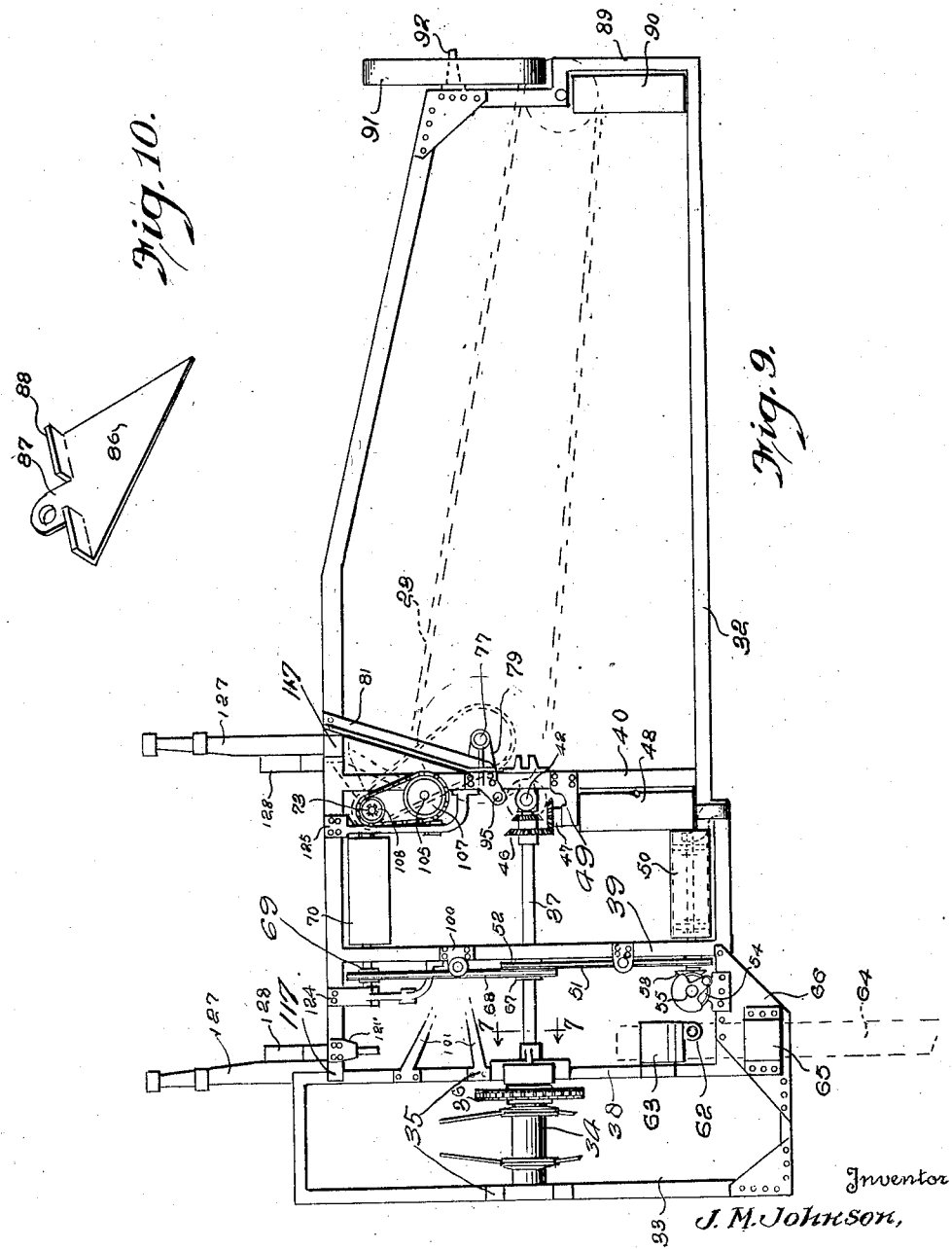

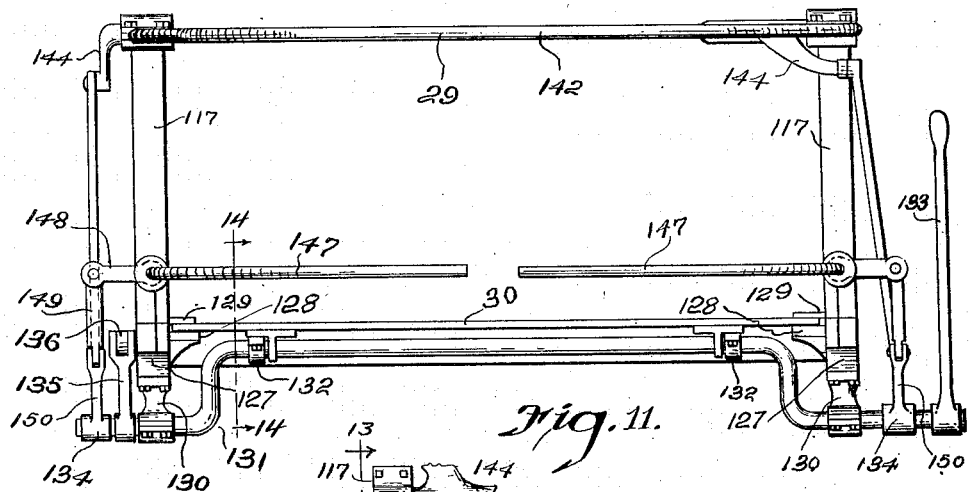
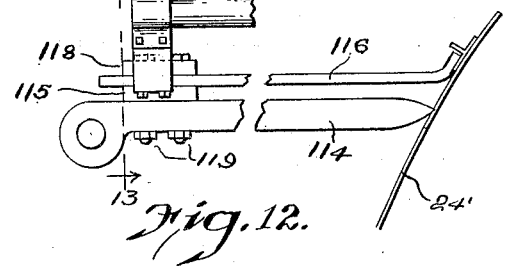
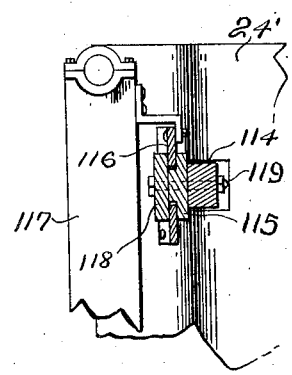

Patented Sept. 23, 1924.

1,509,432

UNITED STATES PATENT OFFICE.

JOSEPH M. JOHNSON, OF RICH HILL, MISSOURI.

COMBINED REAPER, BINDER, AND SHOCKER.

Application filed March 25, 1921. Serial No. 455,505.

*To all whom it may concern:*

Be it known that I, JOSEPH M. JOHNSON, a citizen of the United States, residing at Rich Hill, in the county of Bates and State of Missouri, have invented certain new and useful Improvements in Combined Reapers, Binders, and Shockers, of which the following is a specification.

The invention has for an object to effect improvements in harvesters whereby damage to the grain heads will be minimized. It is also an object to effect improvements in binding grain with a like object in view. Another important aim of the invention is to provide a shocking structure in such a machine whereby the complete operation of cutting, bundling and shocking the grain may be completed in a minimum of operations and movements of the grain. It is an especial aim of the invention to enable the handling of the grain in such manner that the grain heads will not come in contact with parts of the machinery of the harvester during the harvesting and binding operation, and so that it will not be abruptly jarred in any stage, from the moment of cutting to the time when it is deposited as a shock upon the ground.

It is also an aim to improve mechanisms for conveying and guiding grain with such objects in view. A purpose of the invention is to present a desirable construction in means for shaping and tying a shock, and a further aim is to improve the means for discharging a shock when completed.

Additional objects, advantages and features of invention will appear from the construction, arrangement and combination of parts hereinafter described and shown in the drawings, presenting one embodiment of my invention.

Figure 1 of the drawings is a top view of the invention,

Fig. 2 is a side elevation of the machine, showing the position of growing and cut grain with respect to the cutting mechanism.

Fig. 3 is a vertical section on the line 3—3 of Fig. 4.

Fig. 4 is a fragmentary plan of the operating connection, with the knotter mechanism removed to show the drive thereto, and the operative connections between the knotter devices and the needle and shock discharge, and the release device for the shock knotter. This view is taken on a plane with the line 4—4 of Figure 3, except as to the wheel 152', above the plane.

Fig. 5 is a detail elevation of the drive for the bundle counter and the mounting of the shaft therefor, and of the main shaft thereadjacent. This view is on the line 5—5 of Fig. 4.

Fig. 6 is a side elevation of the shock knotter release device as viewed from the right in Fig. 4, non-essential parts being broken away. The line 6—6 of Fig. 4 indicates the plane of this view.

Fig. 7 is a fragmentary elevation showing the drive from the bull wheel to the main shaft, on the line 7—7 of Figure 9.

Fig. 8 is an elevation of the star wheel and cam, and the detent for the shock knotter control operated by the star wheel and release arm shown in Fig. 3—the view being on the line 8—8 of Fig. 1.

Figure 1:
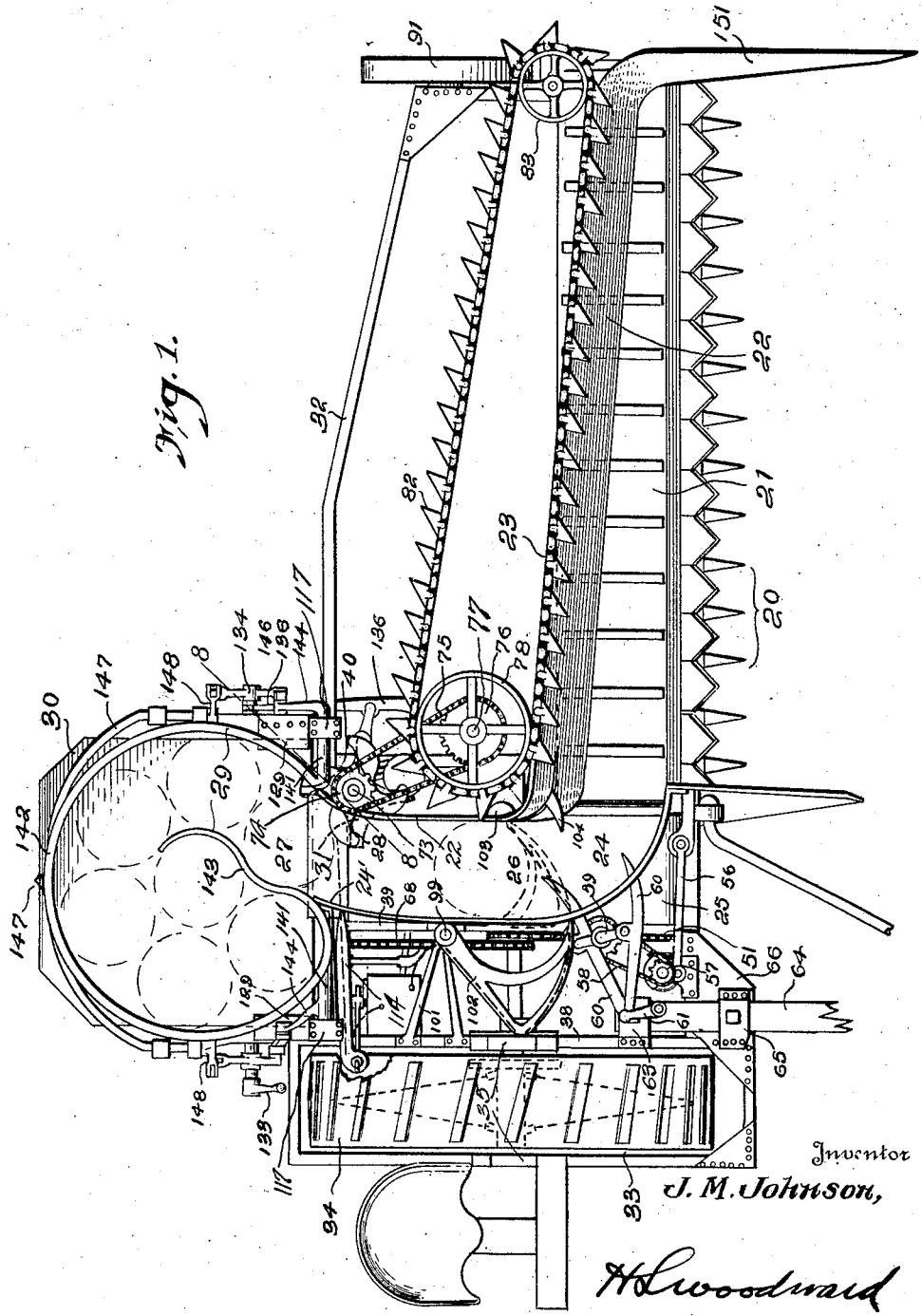

Fig. 8$^a$ is an enlarged view of the last mentioned parts as shown in Fig. 3.

Fig. 9 is a plan view of the frame structure and certain of the drive connections.

Fig. 10 is a detail of one of the vertical grain conveyor teeth.

Fig. 11 is an elevational view of the platform.

Fig. 12 is a detail of the shocker needle mounting.

Fig. 13 is a cross sectional view thereof, on the line 13—13 of Fig. 12.

Fig. 14 is a fragmentary sectional view of the discharge platform and its mounting, on the line 14—14 of Fig. 11.

In the operation of this machine, it is purposed to keep the grain erect at all times, with the heads extended above all operative or other parts close to its path, so that it will not be beaten and loss entailed by dropping of grain, which loss heretofore has been considerable.

The cutter mechanism 20 is of any desired kind, and immediately back of it a horizontal conveyor 21 is provided. Over this conveyor there is erected a smooth metal wall 22 slightly inclined rearwardly at the upper part, against which the grain rests with the butts upon the conveyor, and a chain 23 moving with the conveyor and having teeth or fingers 82 projecting so as to move the stalks adjacent the upper edge of the wall. The wall is quite close to the cutter at the outer part but is inclined and spaced further toward the rear at its inner part to accommodate a greater body of stalks on the conveyor before the wall. This wall is curved into and continued to form the outer side of a fore and aft passage 24 beneath which a belt or apron 25 travels toward the rear, and a building mechanism 26 is provided at the beginning of this passage. The belt moves the stalks rearwardly to the bundling mechanism and also carries the completed bundles rearwardly in erect position to a shocker 27, parts of which form a continuation of the passage mentioned. The shocker includes a packer 28 which moves the bundles into a curved guideway 29 which positions them while erect in symmetrical relation on a floor 30 for tying. As the bundles pass into this guideway they engage a counting wheel 31, which, after a certain number of bundles have passed, causes the shock tying and discharging mechanism to work. In the discharge, the floor supporting the completed shock is moved rearwardly and also lowered at its rear part into close proximity or contact with the ground, with the effect of causing the shock to slide smoothly onto the earth in erect position.

There is illustrated a harvester comprising a frame 32, constructed in a suitable manner for the support of the various elements and mechanisms to be described and not required to conform exactly to the showing made. The same may be said of the various mechanisms hereinafter described, the positions of which may be varied considerably from the exact locations in the drawings, or equivalent mechanisms substituted, such substitution in many instances being within the scope of the invention as claimed more particularly hereinafter.

Various knotter and needle mechanisms are available for use for the bundle tying and shock tying operations, as hereinafter indicated, and various packer devices may also be employed for the same purposes involved in this machine. For this reason it is thought unnecessary to detail the construction of the knotting mechanism particularly, nor of the needle construction, all of which are familiar.

An opening 33 is formed in the frame to receive the bull wheel 34, and at the sides of the opening hangers 35 are secured to the frame, engaged at their upper ends upon respective ends of the shaft of the bull wheel whereby the frame 32 is hung a considerable distance below the axis of the wheel. Upon the hub of the wheel a sprocket 36 is mounted, from which a chain drive is extended to the main shaft 37, journalled on the frame in a horizontal plane, this shaft 37 projecting beneath the sprocket 36. The frame 32 is formed with cross beams, 38, 39, and 40, the first being immediately at the inner side of the opening 33, and suitable bearings for the shaft 37 are provided on the lower end of the hanger 35 attached to the beam 38. The shaft 37 is also journalled in the beam 39 and in a bearing 41 on the beam 40, as shown in Fig. 5. The bearing 41 is provided with a thrust bearing in which there is set the vertical bundle knotter shaft 42 shown in Figs. 4 and 5 and keyed on this shaft immediately over the bearing there is a bevelled gear 43, which meshes with a gear 44 on the shaft 37. The gear 43 may be slidably splined upon the shaft 42 and provided with a grooved hub receiving pins of a branched arm on a bell crank 45 pivoted thereadjacent, by which means the gear 43 may be disengaged at times, if desired. Immediately beyond the gear 44, there is a larger bevel gear 46, meshed with a similar gear 47 on the shaft of a roller 48 carrying the inner end of the conveyor 21, and by which the conveyor is moved. This roller is journalled upon a bracket 49 mounted upon the beam 40 at the geared end, and at the opposite end is journalled in the front element of the frame 32. This front element is provided with an offset portion at the inner part immediately adjacent the roller 48, to accommodate a roller 50, by which the forward end of the belt 25 is carried beneath the passage 24. The shaft of the roller 50 is projected inwardly through the beam 39, immediately adjacent which it is provided with a sprocket driven by chain 51 from a sprocket 52 on the main shaft 37. Outwardly of this chain, the roller shaft is provided with a beveled gear 53 meshed with a gear 54 on the lower end of a counterbalanced crank shaft 55 by which the pitman 56 of the cutter is operated. This shaft is also extended above the crank a distance and provided with a sprocket 57 from which a chain 58 is extended to a vertical crank shaft 59 by which the packers 60 are operated, the inner ends of the latter being pivoted upon suitable levers 61 carried upon a bracket 62 mounted upon a box sleeve 63 receiving the inner end of a tongue 64 by which the machine may be drawn. A forward boxing 65 for the tongue is provided upon a reinforcing plate 66 extended across two adjacent angles of the frame at its forward part. A sprocket 67 is mounted upon the shaft 37 immediately adjacent the sprocket 52, from which a chain 68 is extended to the sprocket 69 on the shaft of a roller 70 at the rear side of the frame, supporting the rear part of the apron 25. At the outer end of this roller shaft a gear 71 is provided meshed with a gear 72 on the lower end of the vertical shaft 73 carrying the packer 28. This shaft is utilized to drive the toothed chain 23 by means of a sprocket 74 at the upper end of the shaft driving the chain 75 engaged with a sprocket 76 secured to an upstanding shaft 77 upon which the sprocket 78 supporting the inner part of the chain 23 is also carried. The shaft 77 is mounted at its lower end upon a bracket 79 projected from the beam 40 (shown in Figs. 5 and 9) from which a column 80 is extended upwardly braced by the diagonal 81, from the rear side of the frame, and having suitable bearings at its upper part. The shaft 77 is so positioned that the periphery of the sprocket 78 falls immediately adjacent the upper edge of the wall 22 but lies a distance outwardly of the passage 24, whereby the teeth 82 on the chain 23 will clear the passage in advance of the bundles. At the outer end of the frame a sprocket 83 is mounted at the upper end of a standard 84 mounted on the frame and braced by the diagonal 85, the chain 23 circulating on the sprocket 83 as shown. The teeth 82 each comprises a sheet metal stamping having a triangular blade part 86 as shown in Fig. 10, a mounting tongue 87 being extended from the base of the tooth to receive one of the link pins of the chain 23. On each side of the tongue downturned flanges 88 are provided, adapted to rest against the outer side of the chain so as to hold the teeth in fixed relation to the chain when passing along the upper edge of the wall 22. The teeth are formed with the advanced edge slightly inclined in the direction of movement of the chain, so that when grain is engaged it will be moved with certainty. The outer end of the frame (see Fig. 9) is formed with a forward outwardly offset portion 89 receiving the roller 90 by which the conveyor 21 is carried at its outer part. Rearwardly of the offset portion 89, the grain wheel 91 is mounted upon a spindle 92 secured to the outer end member of the frame.

The bundling means, other than the packers 60 is operated by the knotter shaft 42. It includes a cam 93 fixed on the shaft 42 which engages a wiper 94 carried by an arm 94' on a shaft 95, the latter being journalled in an extension of the bracket 79. The shaft is projected below the frame and has there an arm 96 from which a link 97 is extended inwardly to a similar arm 98 on the needle shaft 99 mounted upon a bracket 100 carried upon the beam 39. The shaft extends vertically upward between the beam 39 and adjacent chain 68 before mentioned. The shaft 99 is braced by a diagonal bracket 101 and has mounted on its upper end a familiar form of needle 102 which is adapted and movable to compress stalks previously packed against the twine by the packers 60. The needle cooperates with a knotter 103, shown formally in Fig. 1, operated in accordance with well known practice, from the shaft 42, or otherwise as found desirable. The needle is yieldingly held in initial position by a coiled spring 127' as will be described. It is anticipated that no ejector device will be required to move the bundles from the bundling means, but that the grain resting upon the belt 25 will be moved rearwardly toward the shocker device and need for the ejector thus eliminated, with consequent reduction of jar to the grain heads in such a machine.

The needle and knotting means for the shocker mechanism is operated by a countershaft 105 positioned vertically a short distance forwardly of the shaft 73, being mounted upon a bracket 106 on the beam 40, as shown in Fig. 3. A sprocket 107 is fixed on the lower end of the knotter shaft driven by a chain from a smaller sprocket 108 revoluble on the shaft 73 normally, the sprocket 108 being provided with a clutch face at the upper side adapted to cooperate with a clutch member 109 slidably splined on the shaft 73 thereover. A knotter 110 is provided, formally shown in Figures 2 and 3, mounted on a bracket 111 by which the upper portion of the shaft 73 is supported, a knotter cam 112 being mounted on the upper end of the shaft 105, immediately over a supporting bracket 113 for the shaft. A reciprocating rectilinear shaft needle 114 is provided to cooperate with the last named knotter in binding shocks of grain. The needle is carried upon a block 115 having a reduced part fitted slidably in a longitudinally slotted plate 116 mounted upon a standard or post 117 immediately adjacent the frame opening 33. The block 115 has secured thereto an outer plate 118, held by bolts 119 engaged through the needle, the block and the plate. The plate 116 is also supported by being secured to the wall portion 24' at the adjacent side of the passage 24. The plate 116 in the present instance projects slightly within the bull wheel 34 and the needle in its retracted position has its rear end in a similar location. By means of a ball and socket 120 shown in Fig. 3, the needle may be reciprocated by a lever 121 having a rectilinear rod portion engaged slidably through the ball, as shown, the lever being pivoted upon a bracket 121' on the frame 32. The lever is operated by a reciprocating rod 123 suitably mounted in brackets 124 and 125 by which the shaft of the roller 70 is also supported. The rod 123 is provided with an outer downturned and broadened end adjacent the shaft 105, so disposed as to be engaged by a crank and wiper 126 on the lower end of the knotter shaft 105 shown in initial position in Fig. 3. The rod and needle parts are so held by means of a spring 127' connected to the rod and to the beam 39. The wiper element 126 is located below the frame 32 and is utilized to operate a shock discharging mechanism which will be subsequently described.

Upon the rear side of the frame 32, there are two rearwardly projected bracket arms 127, between which there is mounted a movable floor 30 before mentioned, and the arms are provided at their inner ends with rest lugs 128 positioned to receive the inner edge portion of the floor thereon, the rear parts of these lugs being sloped downwardly, as shown in Figs. 9, 11 and 14. These lugs lie slightly below the upper surfaces of the arms 127 so that the floor 30 may rest thereon flush with the upper sides of the arms, the outer part of the floor being free to drop between the arms at times. Guide plates 129 are secured upon the upper parts of the arms over the lugs 128 as shown in Figs. 11 and 14, and are engaged loosely over the inner parts of the floor there adjacent. Upon suitable brackets 130 on the underside of the arms 127 there is mounted a crank shaft 131, the crank of which extends across the underside of the floor at the rear part, as shown in Fig. 11 and is secured rockably thereto by suitable bearings 132. The shaft 131 projects beyond the brackets 130 and has secured at its extremity adjacent the bull wheel a hand lever 133, while immediately inwardly thereof, and at the opposite end, there are secured bell cranks 134. Adjacent the last mentioned or outer end of the shaft, there is an upwardly extending operating lever 135 connected to which there is a horizontally reciprocable automatic discharge and reset bar 136 which extends forwardly beneath the adjacent rear member of the frame 32 and is supported at its forward part by and connected to one arm of a bell crank lever 137, pivoted upon a bracket 138 on the outer side of the beam 40 of the frame, as shown in Fig. 4. The bar 136 is pivoted on an arm for reciprocation to operate the shaft 131 in such a manner as to move the crank thereof and connected floor rearwardly and downwardly to bring the floor into the position shown in dotted lines in Fig. 2. The lever 137 has an arm extended into the path of the wiper 126 so that after action of the needle and knotter for the shocker, engagement of the arm 139 by the wiper 126 will move the bar 136 for discharge action. The inner end of the bar is provided with a goose-neck extension having a plate 140 thereon to lie in the path of the wiper 126 a distance from the arm 139, when the parts are in discharge position, so that the wiper may next engage the plate 140 and return the bar to initial position. It may be noted that after initial movement of the parts for discharge, the weight of the shock upon the floor 30 will cause continuation of movement until the floor comes in contact with the ground. The bundle guide 29 of the shocker is provided with coaxial shaft portions 141, one of which is journalled at the top of the post 117 while the shaft at the opposite side is journalled at the top of a similar post 117, upon which the brackets 112, and 113 are mounted. The guide 29 comprises an outer loop portion 142 (which may be integral with the shaft 141) of a size and shape to accommodate the maximum number of bundles desired in a shock, seven bundles being indicated, although more or fewer bundles may be accommodated. The loop 142 is substantially circular, and is located with its center adjacent a geometrical projection of the inner side of the passage 24, which is curved outwardly at its rear part suitably to permit entrance of bundles to the loop 142 and their movement orbitally within the loop and closely thereagainst. At the left hand side of the passage as viewed in Fig. 1 there is extended from the shaft 141 an inner guide element 143 to ward bundles away from the middle of the guide device as they enter, and to prevent the first bundles entering the device from falling over within the loop 142. The packer 28 is arranged to engage the bundles just as they leave the alley and to propel them from the apron 25 on to the floor 30 and into the passageway between the guide element 143 and the adjacent parts of the loop 142. The shaft portions 141 are each provided with arms 144 connected by links 145 with rearwardly extending arms 146 of the bell crank 134 before mentioned. The guide 29 as described preferably engages the bundles and shock a distance above the twine, and the bundles are supported and retained at their lower part by guides and retainer members 147 at each side of the shocker floor, having outer parts curved to lie beneath the loop 142, while their base portions are mounted in bearings on the arms 127 parallel to the sides of the floor, and are provided with cranks 148 connected by links 149 to upwardly extending arms 150 on the bell crank 134. By this construction, upon discharge action, the members 147 are turned to throw their curved outer ends upwardly and laterally to each side from the middle of the shock, and at the same time, the guide member 29 is raised to clear the upper part of the shock and permit it to move toward the rear from the floor 30, the guide and lower retaining members being shown in discharging position by dotted lines in Fig. 2.

It may be found desirable to vary the inclination of the wall 22 with respect to the vertical, and for this purpose the walls extending from the grain wing 151 to the alley 24 is indicated (see Fig. 2) as an adjustable section pivoted at its upper part upon two brackets 152, extended from the standards 84 and 80 respectively, and at the lower part rearwardly projected ratchet segments are mounted on the wall section engageable by dogs to check the device in adjusted position as at 153. If desired, any suitable form of reel 154 may be employed in operative relation to the cutter 20, or otherwise, the device being formally shown in Fig. 2.

The control devices of the needle and knotter of the shocker include the counting wheel 31, which is revolubly mounted on the shaft 75 and provided with a series of arms projected into the passage 24, so that each bundle passing will engage the wheel 31 to operate it after the manner of a turnstile. Also revoluble on the shaft 73 and fixed to the wheel 31 there is a star wheel 152' the points of which (equal in number to the arms on the wheel 31) are arranged to turn a second vertical starwheel 153' mounted on the terminal part of the wall 22 forming one side of the passage 24 (see Figs. 3, 8 and 8ª.) The wheel 153' is provided with a cam 154' operating a plunger 155 vertically reciprocable in a guide strap 155'. The teeth on the wheel 153' should correspond to the number of bundles which it is desired to tie in each shock (the number of arms and teeth on the wheels 31 and 152' being immaterial, as long as they equal each other.) The plunger 155 rests upon the lateral arm of a pivoted spring-pressed detent 156, the outer end of which is normally engaged under the flange 157 of the clutch member 109 before mentioned so as to hold the latter in raised and disengaged position against the action of a spring 158 thereover. The lateral arm of the detent is held against rising from normal position by the guide 155' when the flange 157 rests on the outer part of the detent, and so sustains the flange and clutch member in disengaged position. When the cam 154' acts, the detent is moved from under the flange 157, permitting the latter to drop, initiating action of the shock binding and discharge elements. The member 109 is raised by lever 159 engaging under the flange 157 after discharge of a shock, and the spring of the detent then again moves the detent to supporting position under the flange 157.

The lever 159 is pivoted on the bracket 79 (see Fig. 6), extending rearwardly immediately over the plate 140 of the shock discharging bar 136, and thence upwardly and inwardly so that its extremity lies beneath the flange 157 and below the level of engaged or lower position of this flange. On the side of the lever 159 there is pivoted a dog 160, arranged to hang in the path of the plate 140, free to swing when engaged by this plate, in discharge movement, but constructed (see Figs. 4 and 6) to engage a block 161 on the lever to be held with its underside inclined to ride on the plate 140 upon return movement of the plate 140 to initial position. The plate will then bear against the dog so as to raise the lever 159 and return the clutch 109 to disengaged position. The dog 160 is also so positioned that full return movement of the bar 136 will clear the dog, permitting the lever 159 to fall to initial position as illustrated. It should be noted that the parts in Figure 4 are in initial position, and engagement of the clutch when bundles for a shock have accreted on the floor 30 will cause rotation of shaft 105 clockwise. The rod 123 will immediately be engaged and operated, causing action of the needle; and the knotter 110 then operates. After operation of this knotter the wiper 126 engages the arm 139 of the bell crank lever 137 the other arm of which thereby throws the bar 136 outwardly, the thrust of which bar upon the lever 135 rocks the shaft 131 and moves the floor 30 to discharge position. The movement of the bar 136 in this manner brings the plate 140 rearwardly to a position where it will be engaged by the wiper 126 immediately after the wiper clears the arm 139, and this results in return of the bar 136 to initial position.

It should be noted that upon completion of these movements, the wiper arm 126 will have returned to a position adjacent the bar 123 and will be checked resiliently at initial position by the action of the spring 127', and bar. It should also be noted that with the parts positioned as shown in Fig. 4, the dumping mechanism may be operated at any time by means of the lever 133, without interference. Casual operation of the shock discharge may be guarded against by locating the center of the crank shaft 131 slightly beyond dead center over the bearings 132.

What is claimed:

1. In a machine of the character described, a cutter, a horizontal endless belt conveyor parallel to and behind the cutter, positioned to receive grain butts end-on in abutment therewith, a longitudinal grain rest guide over the conveyor close to the cutter at the outer part and diverging inwardly from the cutter, an upper conveyor alined with the said guide having grain-engaging projections and progressive with the first conveyor, and binding means positioned to receive from the conveyors.

2. In a shock former, a guide device having a curved and bundle-embracing form, means to move bundles orbitally thereinto, means to tie a shock therein, means to raise the guide device, and means to simultaneously discharge a shock.

3. In a shock former, a guide device curved to embrace a plurality of bundles, and having an entrance opening, an inner guide piece extended from one side of the entrance into the guide device aforesaid in a relation with the opposite side of the entrance to snugly receive bundles therebetween, means to deliver bundles to the former, means to tie a shock therein, means to raise the guide device above a shock therein, and means to simultaneously discharge a shock.

4. In a shock former, a frame, a cranked shaft mounted thereon, a floor secured on the crank for movement therewith, guide means to support an inner part of the floor in raised positions, and means to rock the shaft, whereby the floor will be reciprocated in a horizontal direction and oscillated vertically.

In testimony whereof I have affixed my signature in presence of two witnesses.

JOSEPH M. JOHNSON.

Witnesses:
H. M. KLUMPP,
BEN BARNHILL.